United States Patent
Rekaya Ben-Othman et al.

(10) Patent No.: US 10,425,162 B2
(45) Date of Patent: Sep. 24, 2019

(54) SCRAMBLER FOR A MULTIMODE OPTICAL FIBER AND OPTICAL TRANSMISSION SYSTEM USING SUCH SCRAMBLER SYSTEMS

(71) Applicant: INSTITUT MINES-TELECOM, Paris (FR)

(72) Inventors: Ghaya Rekaya Ben-Othman, Antony (FR); Yves Jaouen, Paris (FR); El-Mehdi Amhoud, Paris (FR)

(73) Assignee: INSTITUT MINES-TELECOM, Paris (FR)

( * ) Notice: Subject to any disclaimer, the term of this patent is extended or adjusted under 35 U.S.C. 154(b) by 0 days.

(21) Appl. No.: 15/651,273

(22) Filed: Jul. 17, 2017

(65) Prior Publication Data

US 2018/0019817 A1 Jan. 18, 2018

(30) Foreign Application Priority Data

Jul. 18, 2016 (EP) .................................. 16305925

(51) Int. Cl.
*H04B 10/2581* (2013.01)
*H04B 10/50* (2013.01)
(Continued)

(52) U.S. Cl.
CPC ......... *H04B 10/2581* (2013.01); *H04B 10/50* (2013.01); *H04B 10/60* (2013.01);
(Continued)

(58) Field of Classification Search
CPC .......................... H04B 10/12; H04B 10/2507; H04B 10/2581; H04B 10/50; H04B 10/60;
(Continued)

(56) References Cited

U.S. PATENT DOCUMENTS 5,138,675 A * 8/1992 Schofield ................. G02B 6/14
372/6
5,754,716 A * 5/1998 Kim ..................... A61B 5/1459
385/28

(Continued)

FOREIGN PATENT DOCUMENTS

EP 2903185 A1 * 8/2015 ......... H01S 3/06758
EP 2903185 A1 8/2015
(Continued)

OTHER PUBLICATIONS

P. Winzer et al.,"MIMO capacities and outage probabilities in spatially multiplexed optical transport systems," Opt. Express, 2011.

(Continued)

*Primary Examiner* — Abbas H Alagheband
(74) *Attorney, Agent, or Firm* — Meagher Emanuel Laks Goldberg & Liao, LLP

(57) ABSTRACT

Embodiments of the invention provides a deterministic scrambler (1) arranged in a multimode optical fiber (130) for scrambling light, the light comprising a set of optical signals propagated in said multimode optical fiber according to a set of propagation modes, each propagation mode being associated with a power value, wherein the scrambler is configured to determine a permutation of said propagation modes depending on the power values associated with said propagation modes, the scrambler being configured to redistribute the optical signals according to said permutation of the propagation modes.

11 Claims, 11 Drawing Sheets

(51) Int. Cl.
   *H04B 10/60* (2013.01)
   *H04L 1/00* (2006.01)
   *H04J 14/02* (2006.01)
   *H04J 14/04* (2006.01)
   *G02B 6/14* (2006.01)
   *H04B 10/61* (2013.01)

(52) U.S. Cl.
   CPC .............. *H04L 1/004* (2013.01); *G02B 6/14* (2013.01); *H04B 10/611* (2013.01); *H04B 10/613* (2013.01); *H04J 14/02* (2013.01); *H04J 14/04* (2013.01)

(58) Field of Classification Search
   CPC .... G02B 6/26; G02B 6/14; H04J 14/04; H04J 14/02; H04L 1/004
   USPC .......................... 398/142, 158, 192, 194, 211
   See application file for complete search history.

(56) References Cited

U.S. PATENT DOCUMENTS

| | | | | |
|---|---|---|---|---|
| 8,320,769 | B2* | 11/2012 | Essiambre | G02B 6/14 398/143 |
| 8,355,638 | B2* | 1/2013 | Essiambre | H04B 10/2581 398/143 |
| 8,630,545 | B2* | 1/2014 | Gholami | H04B 10/2581 398/143 |
| 8,867,125 | B2* | 10/2014 | Ryf | H01S 3/06754 359/341.1 |
| 9,759,860 | B2* | 9/2017 | Essiambre | H04J 14/04 |
| 9,819,439 | B2* | 11/2017 | Ryf | H04B 10/2581 |
| 2005/0002614 | A1* | 1/2005 | Zhong | G02B 6/2835 385/50 |
| 2010/0142969 | A1* | 6/2010 | Gholami | H04B 10/2507 398/143 |
| 2010/0329670 | A1* | 12/2010 | Essiambre | H04B 10/2581 398/43 |
| 2012/0224807 | A1* | 9/2012 | Winzer | G02B 6/14 385/28 |
| 2013/0230311 | A1* | 9/2013 | Bai | H04B 10/2581 398/9 |
| 2013/0230319 | A1* | 9/2013 | Essiambre | G02B 6/14 398/44 |
| 2014/0055843 | A1* | 2/2014 | Roland | H01S 3/06754 359/341.3 |
| 2014/0126915 | A1 | 5/2014 | Gruner-Nielsen et al. | |
| 2015/0333829 | A1* | 11/2015 | Chen | H04B 10/60 398/143 |
| 2015/0333830 | A1* | 11/2015 | Chen | H04B 10/2581 398/178 |
| 2016/0043826 | A1* | 2/2016 | Zhou | H04J 14/02 398/44 |
| 2017/0195052 | A1* | 7/2017 | Awwad | H04J 14/04 |
| 2017/0207850 | A1* | 7/2017 | Takahashi | H04B 10/60 |

FOREIGN PATENT DOCUMENTS

| | | | | |
|---|---|---|---|---|
| EP | 2903185 | B1 * | 12/2016 | ......... H01S 3/06758 |
| FR | 3023436 | A1 | 1/2016 | |

OTHER PUBLICATIONS

C. Antonelli et al., "modeling and performance metrics of MIMO-SDM systems with different amplification schemes in be presence of modedependent loss," Opt. Express 23, 2203-2219 2015.
A. Lobato et al., "On the mode-dependent loss compensation for mode-division multiplexed systems,"(ICTON), Jun. 23-27, 2013.
K. Ho et al, "Mode-dependent loss and gain: statistics and effect on mode-division multiplexing," Opt. Express 19, 16612-16635 (2011).
M. Tokuda, S. Seikai, K. Yoshida, N. Uchida, Measurement of Baseband Frequency Reponse of Multimode Fibre By Using a New Type of Mode Scrambler, Electronics Letters, vol. 13, Issue: 5, Mar. 1977.
A. Li, A Al Amin, X. Chen, and W. Shieh, Transmission of 107-Gb/s mode and polarization multiplexed CO-OFDM signal over a two-mode fiber, Optics Express vol. 19, Issue: 9, pp. 8808-8814, 2011.
European Search Report for 16305925.6 dated Jan. 17, 2017.
Stefan Warm etal: "Splice loss requirements in multi-mode fiber mode-division-multiplex transmission links", Optics Express, vol. 21, No. 1, Jan. 14, 2013 (Jan. 14, 2013), pp. 519-532.
Korean Office Action issued in corresponding KR 10-2017-0090583, dated Mar. 29, 2019.
Yejian Chen, et.al., "Space-Time Coding Schemes for Optical MIMO", in Proceedings 37th European Conference and Exposition on Optical Communications, (Sep. 22, 2011).

* cited by examiner (a) BER performance of 6-mode fiber. $\sigma_{x,y} = 3\% r_c$ (b) BER performance of 6-mode fiber. $\sigma_{x,y} = 4\% r_c$

SCRAMBLER FOR A MULTIMODE OPTICAL FIBER AND OPTICAL TRANSMISSION SYSTEM USING SUCH SCRAMBLER SYSTEMS

TECHNICAL FIELD

The invention generally relates to optical communications and in particular to a scrambler arranged in a multimode optical fiber, for scrambling light.

BACKGROUND

Optical transmission systems based on optical fibers are being used to transmit relatively large amounts of information in numerous applications such as telecommunications and data networking. With a growing demand for faster broadband and more reliable networks, optical communication systems based on optical fibers face important challenges.

Optical fibers represent optical waveguides that guide electromagnetic waves in the optical spectrum. The propagation of the waves along an optical fiber depends on several parameters related to the fiber such as its geometry, its mode structure, the distribution of the refractive index, the material it is made of, etc. Optical fibers typically include a transparent core surrounded by a transparent cladding material with a lower index of refraction. The cladding is such that the light launched into the core remains in the core. The optical fiber, which acts as a waveguide, guides the light launched into the fiber core. When the light launched into the core strikes the cladding, it undergoes a number of internal reflections.

There exist two types of optical fibers: multimode optical fibers and single-mode optical fibers. The difference between these two types of fibers lies on the number of modes allowed to propagate in the core of a fiber. As used herein, a "mode" refers to an allowable path (light propagation path) for the light to travel down a fiber.

A multimode fiber allows several modes while a single-mode fiber allows only one mode.

In a multimode fiber, the time taken by light to travel through a fiber is different for each mode, which results in a spreading of the pulse at the output of the fiber (which is referred to as "intermodal dispersion").

The difference in the time delay between the modes is called Differential Mode Delay (DMD). Intermodal dispersion limits multimode fiber bandwidth. A fiber's bandwidth determines the information carrying capacity of the fiber, which includes how far a transmission system can operate at a specified bit error rate and the upper bound on the rate at which information can be reliably transmitted over the optical transmission channel. By limiting the fiber bandwidth, intermodal dispersion reduces the information rate that can be achieved with arbitrarily small error probability.

A single-mode fiber does not present intermodal dispersion and has higher bandwidth than multimode fiber. A single-mode fiber allows for higher data rates over much longer distances than achievable with a multimode fiber.

Although single-mode fiber has higher bandwidth, multimode fiber supports high data rates at short distances. Multimode fibers are consequently particularly used in shorter distance and in cost sensitive LAN applications. Multi-mode fibers allow the propagation of many modes in a single-core or in multi-core fibers where each core can be single-mode or multi-mode. The various propagation modes form a set of orthogonal channels over which independent data symbols can be multiplexed. Space Division Multiplexing (SDM) techniques such as Mode Division Multiplexing (MDM) can be used to perform such multiplexing, which results in an increase of the link capacity by a factor corresponding to the number of propagation modes. Since Wavelength division Multiplexing (WDM) systems are approaching the nonlinear Shannon limit, Space division multiplexing (SDM) holds the promise to increase the capacity of the optical transmission links.

Multimode fibers can offer higher transmission rates than their single-mode counterparts. However, taking advantage of the presence of multiple modes to multiplex and transmit larger amount of data symbols requires managing several modal detrimental impairments. These impairments are mainly due to imperfections of the optical components (e.g. fibers, amplifiers and multiplexers) and to the crosstalk effects between the various propagation modes. Such imperfections induce non-unitary impairments, i.e. impairments that cause a loss of orthogonality and/or a loss of energy between the different channels over which independent data symbols are multiplexed. Such impairments can significantly reduce the capacity of the optical links and deteriorate the performance of the transmission system, particularly in long distances applications.

The bandwidth of a multimode fiber is generally higher than that of single-mode fibers, each mode being separately modulated and the signal to be transmitted being multiplexed on different modes. This bandwidth is limited by the coupling between modes during propagation ("crosstalk inter-mode").

In addition, for long distances, amplifiers are needed between the optical fiber sections. As a result of the modal dispersion of the amplifier gain, the modes do not undergo the same attenuation. Other components, such as optical multiplexers or demultiplexers for example, as well as imperfections in the fiber may further impact the attenuation. The differential loss between modes, also called MDL (acronym for "Mode Division Multiplexing"), induces increased sensitivity to noise sources, thereby limiting the scope of these systems.

Multicore fibers comprise a plurality of cores (usually 2 to 7 cores) within a common cladding. The small size of the cores only allows single mode propagation in each of them. Unlike multimode fibers, multicore fibers do not present modal dispersion. In contrast, the evanescent waves create a coupling between the different cores (inter-core crosstalk), the level of crosstalk being all the higher as the number of cores is high and the inter-core distance is low. Such crosstalk affecting propagating modes through multi-mode fibers is also known as Mode Dependent Loss (MDL). MDL effects require either optical or digital signal processing solutions to be reduced.

The impact of MDL effect is detrimental to channel capacity as disclosed in a number of studies, such as:

P. Winzer et al., "MIMO capacities and outage probabilities in spatially multiplexed optical transport systems," Opt. Express, 2011;

C. Antonelli et al., "modeling and performance metrics of MIMO-SDM systems with different amplification schemes in the presence of mode-dependent loss," Opt. Express 23, 2203-2219 2015.

A. Lobato et al., "On the mode-dependent loss compensation for mode-division multiplexed systems," (ICTON), 23-27 Jun. 2013.

A proposed solution to mitigate the MDL effect has been described in K. Ho et al, "Mode-dependent loss and gain: statistics and effect on mode-division multiplexing," Opt.

Express 19, 16612-16635 (2011). According to this approach, strong mode coupling is used to reduce MDL and modal dispersion.

In other approaches, it is known to use mode scrambling to couple modes at local points. Existing mode scramblers are designed to solve problems of bandwidth measurement reproducibility in multi-mode fibers. In particular, some mode scramblers (also called 'mode mixers' or 'mode couplers') were proposed to provide a uniform input mode power distribution.

A mechanically-induced implementation of mode scrambler may be used, as disclosed in:
"M. Tokuda, S. Seikai, K. Yoshida, N. Uchida, Measurement of Baseband Frequency Response of Multimode Fibre By Using a New Type of Mode Scrambler, Electronics Letters, Volume: 13, Issue: 5, March 1977", and
"A. Li, A. Al Amin, X. Chen, and W. Shieh, Transmission of 107-Gb/s mode and polarization multiplexed CO-OFDM signal over a two-mode fiber, Optics Express Volume: 19, Issue: 9, pages 8808-8814, 2011";

Mechanically-induced scrambling designs are based on a mechanical perturbation in the form of the fiber via different ways such as sinusoidal serpentine bends, gratings, and joining fibers having different profiles.

Another way to implement mode scrambling is based on the use of optical components such as mode converters.

MDL mitigation based on mechanically-induced mode scrambling was addressed in some conventional implementations. For example, in S. Warm et al., "Splice loss requirements in multi-mode fiber mode-division-multiplexed transmission links," Opt. Express 21(19), 2013, a random mode permutation is added after a certain number of fiber splices in order to reduce the correlation of modal coupling. In FR3023436, an optical fiber transmission system equipped with random scramblers has been proposed to switch propagation modes or cores. Such a system comprises a space-time encoder and a plurality of modulators respectively associated with separate propagation modes or cores of the fiber, each modulator modulating a laser beam. The fiber comprises a plurality of sections, an amplifier provided between any two consecutive sections of the optical fiber, and a mode switch associated with each amplifier in order to switch the modes between at least two consecutive sections. A mode scrambler is associated to each amplifier for randomly permuting the modes between at least two consecutive sections. However, the random permutation of the modes is not sufficient to average the MDL effect experienced by all the propagation modes. More generally, existing approaches based on the use of scramblers require an important number of mode-scramblers (one scrambler for each amplifier) and provide limited performance.

There is accordingly need for an improved scrambler.

SUMMARY

In order to address these and other problems, there is provided scrambler arranged in a multimode optical fiber for scrambling light, the light comprising a set of optical signals propagated in the multimode optical fiber according to a set of propagation modes, each propagation mode being associated with a power value. The scrambler is configured to determine a permutation of the propagation modes depending on the power values associated with the propagation modes, the scrambler being configured to redistribute the optical signals according to the permutation of the propagation modes.

In one embodiment, the scrambler may comprise a permutation unit for permuting the modes two-by-two, the permutation unit being configured to permute the mode associated with the i-th higher power value with the mode associated with the i-th lower power value, for each index i being comprised between 1 and the floor part of half the number of modes used by the scrambler.

In certain embodiments, the power value associated with a propagation mode may represent an estimate of average energy received by propagating an optical signal through the propagation mode at a receiver.

The optical signal may be propagated through the mode with a unitary energy at the transmitter side.

There is further provided an optical fiber transmission link comprising a multimode optical fiber, the fiber comprising fiber slices. The optical fiber transmission link comprises at least one scrambler according to any preceding features, each scrambler being inserted between two fiber slices.

The optical fiber transmission link may comprises at least two scramblers arranged in the fiber according to a predefined period, the number of scramblers being strictly inferior to the number of fiber slices.

The number of scramblers may be determined from a target Mode Dependent Loss, and/or the length of the fiber and/or the number of amplifiers.

The fiber slices may be misaligned in one or two directions.

There is also provided an optical communication system comprising an optical transmitter configured to transmit a data sequence over at least two spatial propagation modes through the optical transmission link according to any preceding embodiment.

The optical communication system may comprise:
  a forward error correcting code encoder configured to encode the data sequence into a codeword vector by applying at least one error correcting code;
  a modulator configured to determine a set of modulated symbols by applying a modulation scheme to the codeword vector; and
  a Space-Time encoder configured to determine a codeword matrix by applying a Space-Time code to the set of modulated symbols.

The optical communication system may comprise an optical receiver for decoding a signal comprising a data sequence received from the optical transmission link.

In certain embodiments, the receiver may comprise:
  a Space-Time decoder configured to decode the signal over a set of propagation modes lower than or equal to the at least two spatial propagation modes, which provides a set of modulated symbols;
  a demodulator configured to determine an estimate of the codeword vector from the estimation of the set of modulated symbols by applying a demodulation scheme; and
  a Forward Error Correcting code decoder configured to generate an estimate of the data sequence by applying at least one error correcting code decoder to the codeword vector.

By using at least one deterministic scrambler that permutes the modes depending on the power value associated with the modes, the various embodiments of the invention mitigate the impact of MDL. The proposed multimode optical fiber transmission system requires only a small number of mode-scramblers in the line, while improving the performance over conventional scramblers.

Further advantages of the present invention will become clear to the skilled person upon examination of the drawings and the detailed description. It is intended that any additional advantages be incorporated herein.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, illustrate some embodiments of the invention.

DESCRIPTION

Figure 1:
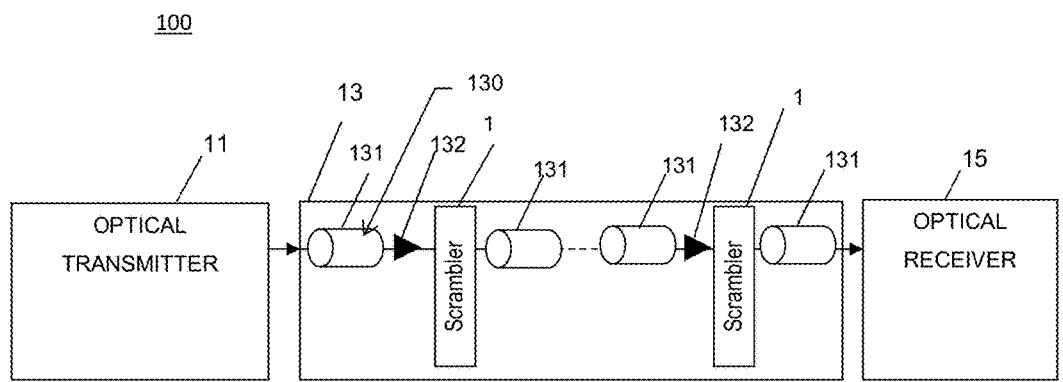
FIG. 1 illustrates an exemplary application of the invention in a communication system 100 based on optical fiber transmission.

Embodiments of the present invention provide an improved scrambler (also referred to hereinafter as "deterministic scrambler" or "mode scrambler") arranged in a multimode optical fiber for scrambling light. One or more scramblers according to the embodiments of the invention may be used in an optical fiber transmission system. The light comprises a set of optical signals propagated in the multimode optical fiber according to a set of waveguide modes. A multimode fiber is affected by modal dispersion (referred to as MDL, acronym for Mode Dependent Loss). The scrambler according to the embodiments of the invention efficiently reduces the impact of MDL in terms of bit error rate by scrambling light, according to power values associated with the waveguide modes.

In particular, the mode scrambler may be configured to determine a permutation of the waveguide modes on the basis of the power values associated with said waveguide modes, the scrambler being configured to redistribute the optical signals according to said permutation of the waveguide modes.

Devices, methods and computer program products according to the various embodiments of the invention may be implemented in optical fiber transmission systems applied to a wide variety of applications. Exemplary applications comprise without limitation, telecommunications, aerospace and avionics, data storage, automotive industry, imaging, and transportation.

Telecommunication applications may be implemented in desktop computers or terminals to nationwide networks. Such applications may involve data transfer over distances ranging from less than one meter up to hundreds or thousands of kilometers (e.g. transmission of voice, data, or video) or use network components connection (e.g. connection for switches or routers in local area networks).

The following description of certain embodiments will be made with reference to a telecommunication system, for illustration purpose only. However, the skilled person will readily understand that the various embodiments of the invention may be applied to other types of systems for different applications using optical fibers, such as for example:

- In aerospace and avionics applications (e.g. military and/or commercial applications); in such applications, optical fiber technologies and products are designed to satisfy rigorous testing and certifications requirements in harsh environments and conditions;
- In data storage applications, the optical fibers being used for example in data storage equipment as a link between multiple devices in a network and/or as part of a storage system. In data storage applications, optical fiber connectivity offers very high bandwidth even over extended distances;
- In automotive industry applications, the optical fiber being used for example in lighting, communications and sensing for safety and control devices and systems;
- In imaging applications (e.g. telemedicine), the optical fibers being used to transmit an image of a target or a subject area to the image view end for analysis and/or interpretation;
- In transportation applications, the optical fibers being used in telemetry systems, in applications such as smart highways with intelligent traffic lights, automated tollbooths and changeable message.

FIG. 1 illustrates an exemplary application of the invention in a communication system 100 based on optical fiber transmission. The communication system 100 comprises at least one optical transmitter device 11 (hereinafter referred to as a "transmitter") configured to encode an input data sequence into an optical signal and transmit it to at least one optical receiver device 15 (hereinafter referred to as a "receiver") through an optical fiber transmission channel 13 (also referred to hereinafter as an "optical fiber transmission link").

The optical fiber transmission channel 13 comprises an optical fiber 130. The optical fiber 130 comprises one or more fiber slices 131, which may be aligned or misaligned. Optical components may be inserted between the slices. In particular, the optical fiber transmission channel 13 may comprise one or more amplifiers 132 inserted in the fiber. The amplifiers may be regularly inserted in the fiber. In particular, each amplifier may be inserted between a pair of fiber slices along the optical fiber link to compensate for the fiber attenuation and carry the signal over long distances without the need to regenerate the optical signal. Exemplary optical amplifiers comprise Erbium doped fiber amplifiers (EDFA). Such amplifiers may be implemented in long-haul optical transmissions. The amplifiers may be inserted every 40 to 120 kilometers to enhance the signal power according to the type of the fiber, the length of the optical link and the application.

In some embodiments using multi-mode fibers, the amplifiers 132 may be configured to simultaneously amplify the optical signal corresponding to a plurality of propagation modes. Exemplary amplifiers in such embodiments comprise Few Mode Amplifiers such as Few Mode Erbium Doped Fiber Amplifiers.

In some embodiments, the optical signal amplification may be performed in a distributed manner using the non-linear simulated Raman scattering effect. In such embodiments, the fiber may be used as both a transmission link and an amplification medium.

In other embodiments, signal amplification may be achieved by a joint use of regularly arranged optical amplifiers (such as EDFA, acronym for "Erbium-doped Fiber Amplifiers") and of simulated Raman Scattering effects.

In still other embodiments, the signal amplification may be performed in the electrical domain through an optical/electrical conversion (not shown in FIG. 1). In such embodiments, the optical fiber transmission channel 13 may comprise, at each amplification stage:
- a photodiode for converting the optical signal back to the electrical domain;
- an electrical amplifier for amplifying the converted electrical signal; and
- a laser diode for generating an optical signal corresponding to the amplified electrical signal.

Figure 2:
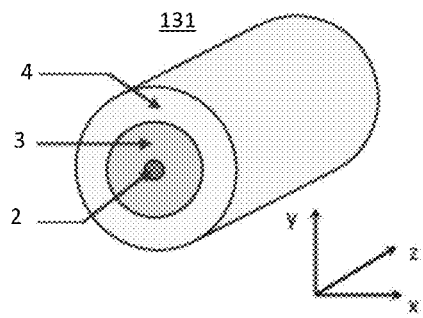
FIG. 2 shows a fiber slice.

Referring to FIG. 2, a fiber slice 131 is depicted. As shown, the optical fiber 130 forms a cylindrical non-linear waveguide comprising a core 2, a cladding 3 and a coating 4. The optical signal sent by the optical transmitter 11 is confined in the core 2 through total internal reflections due to the difference between the refractive index $n_{co}$ of the core 2 ($n_{co}$) and the refractive index $n_{cl}$ of the cladding 3. Depending on the radius $r_{co}$ of the core 2, the refraction index difference $D=(n_{co}-n_{cl})/n_{co}$, and the wavelength $\lambda_o$ of the optical carrier, the light waves propagate in distinct propagation modes. As used herein, a "propagation mode" represents the distribution of the energy of a light wave across the fiber section.

The number of propagating modes may be determined from a dimensionless parameter (also called "normalized frequency") defined by the optical and geometrical properties of the fiber 130. For example, for a step-index fiber, the dimensionless parameter V is defined as follows:

$$V = \frac{2\pi r_{co}}{\lambda_0} \sqrt{n_{co}^2 - n_{cl}^2} = \frac{2\pi r_{co}}{\lambda_0} NA, \quad (1)$$

with $NA=\sqrt{n_{co}^2-n_{cl}^2}$ representing the numerical aperture of the fiber.

The skilled person will readily understand that the invention is not limited to step-index fibers and apply to different types of multimode fiber such as a graded index fiber for example.

Turning back to FIG. 1, the propagation of an optical signal along the optical fiber slices 131 is thus defined by the number of propagation modes that may depend on several parameters such as the radius of the fiber core, the wavelength of the optical carrier and the difference between the refraction index of the core and the cladding.

According to certain embodiments of the invention, the optical fiber transmission channel 13 comprises at least one mode scrambler 1 (also referred to simply hereinafter as "scrambler") to reduce the crosstalk effect and average the losses experienced by the propagation modes. Each scrambler 1 may be associated with an optical amplifier 132. The scramblers 1 may be inserted in the optical fiber according to different arrangements. In some embodiments, the number of scramblers may be strictly inferior to the number of amplifiers 132.

In embodiments where space division multiplexing is implemented at the optical fiber transmission channel 13 with a multimode fiber supporting a number N≥2 of propagation modes, the use of a scrambler 1 according to the invention efficiently mitigates the effects of crosstalk and inter-symbol interference, with a reduced number of scramblers. Crosstalk and inter-symbol interference effects result from an overlapping of the propagation modes due to energy transfer between the modes that induces a coupling of each propagation mode along the fiber. Large core fibers are examples of multimode fibers supporting a large number of propagation modes. Few-mode fibers support a number of propagation modes comprised between two (2) and ten (10). Each propagation mode may be associated with a different group velocity.

Figure 3:
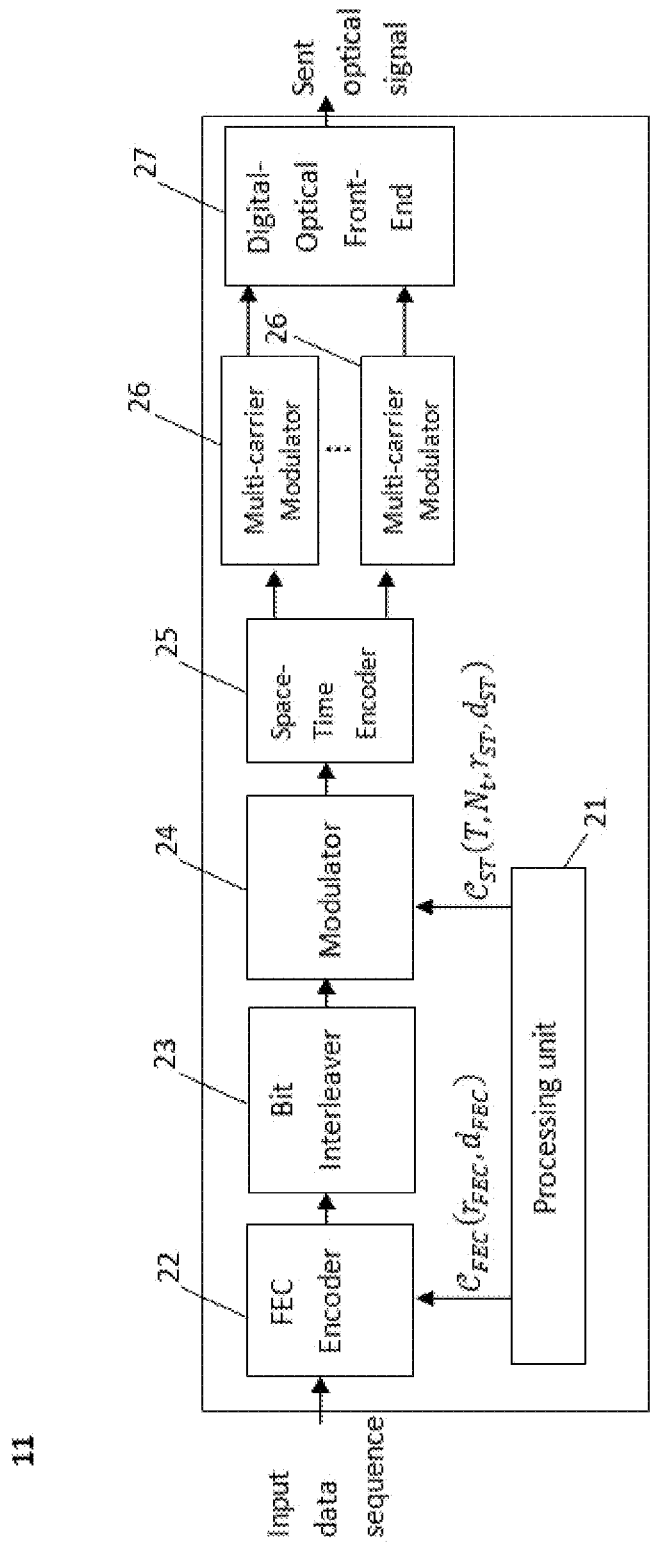
FIG. 3 shows the architecture of the optical transmitter 11, according to certain embodiments.

FIG. 3 shows the components of the optical transmitter 11, according to certain embodiments. The optical transmitter 11 may be configured to transform an input data sequence into an optical signal to be transmitted through the optical transmission channel 13. The transmitter 11 may code the input data sequence using a forward error correction (FEC) module and then convert the coded data sequence to the optical domain by using an electro-optical modulator. The optical signal provided by the transmitted 11 may be transmitted in the fiber link formed by the fiber transmission channel 13. The optical amplifiers 131 arranged in the fiber transmission channel 13 may then compensate for the fiber attenuation and carry the signal over thousands of kilometers. In some embodiments, as depicted in FIG. 3, the optical transmitter 11 may comprise:
- a FEC encoder 22 configured to encode the input data sequence of length k (i.e. comprising k symbols) into an encoded sequence in the form of a codeword vector of length n>k by applying at least one Forward Error Correcting code (FEC);
- an interleaver 23 configured to mix the encoded symbols to add a protection layer to the symbols against burst errors before being modulated;
- a modulator 24 configured to modulate the interleaved encoded sequence by applying a modulation scheme such as Quadrature Amplitude Modulation (QAM) and deliver a set of modulated symbols;
- a Space-Time Encoder 25 configured to generate a codeword matrix carrying the data symbols to be sent through the optical transmission channel 13 during a Time Transmission Interval (TTI).

The Space-Time encoder 25 may be configured to transform each received sequence (or block) of Q modulated symbols $s_1, s_2, \ldots, s_Q$ into a codeword matrix X of dimensions $N_t \times T$. A codeword matrix comprises complex values arranged in $N_t$ rows and T columns where $N_t$ represents the number of propagation modes used by the transmitter 11 and T represents the temporal length of the ST code. T thus also corresponds to the number of temporal channel used for the transmission. Each entry of the codeword matrix accordingly corresponds to a time of use and to a used propagation mode.

According to some embodiments, the input data sequence may be a binary sequence comprising k bits. The FEC encoder 22 may be configured, in such embodiments, to encode the input binary sequence into a binary codeword vector comprising n bits by applying at least one binary FEC code. A forward error correcting code $C_{FEC}$ encoding a sequence of k bits into a sequence of n bits has a coding rate equal to $$r_{FEC} = \frac{k}{n} < 1$$

(hereinafter referred to as "forward error correction coding rate").

In some other embodiments, the input data sequence may comprise symbols that take values in a Galois Field GF(q) with q>2 representing the order of the Galois Field. In such embodiments, the FEC encoder 22 may be configured to encode the input data sequence into a codeword vector comprising n symbols. Each symbol comprised in the codeword vector takes value in the Galois Field GF(q). The encoding process may be performed using a non-binary FEC code constructed over GF(q) with q>2.

The skilled person will readily understand that the embodiments of the invention also apply to non-binary FEC coding. It should be noted that Binary FEC codes can be seen as codes constructed over the Galois Field GF(q) of order equal to q=2.

The encoded sequence or codeword vector denoted by c belongs to a set of codeword vectors known as "alphabet" or "codebook" (referred to as $A_{FEC}$). The codebook $A_{FEC}$ comprises the set of all possible values of the codeword vectors.

A Space-Time code $C_{ST}$ encoding a sequence of Q modulated symbols into a codeword matrix X of dimensions $N_t \times T$ has a Space-Time coding rate equal to $$r_{ST} = \frac{Q}{T}$$

symbols per channel use ("symbols per channel use" will be noted hereinafter as "s/c.u"). T represents the temporal dimension of the Space-Time code $C_{ST}$ and $N_t$ designates the space dimension equal to the number of spatial propagation modes used in the multi-mode fiber at transmitter side. A codeword matrix X can be written in the form:

$$X = \begin{pmatrix} x_{11} & \cdots & x_{1T} \\ \vdots & \cdots & \vdots \\ x_{N_t 1} & \cdots & x_{N_t T} \end{pmatrix} \quad (2)$$

In equation (3), each value $x_{ij}$ of the codeword matrix X corresponds to the $i^{th}$ propagation mode, for i=1, ..., $N_t$, and the $j^{th}$ time of use, for j=1, ..., T. Each codeword matrix X belongs to a set of codeword matrices $A_{ST}$ (also called "codebook" or "alphabet"). The codebook $A_{ST}$ comprises the set of all possible values of the codeword matrices. Card($A_{ST}$) designates the number of codeword matrices in the alphabet $A_{ST}$.

Exemplary error correcting codes include for example the Hamming codes, the Reed-Solomon codes, the convolutional codes, the BCH codes, the Turbo codes, binary Low-Density Parity Check (LDPC) codes, and non-binary LDPC codes.

Exemplary Space-Time codes include for example orthogonal codes, quasi-orthogonal codes, the Perfect codes, and the TAST (acronym for Threaded Algebraic Space Time) code. Exemplary orthogonal codes comprise the Alamouti code.

In some embodiments, the optical transmitter 11 may be configured to transmit the optical signal using all available propagation modes. In such embodiments, the number of used propagation modes $N_t$ may be equal to all the propagation modes N.

In certain embodiments, the transmitter 11 may include a propagation mode selector (not shown) to select propagation modes that are used to propagate the optical signal along the fiber, according to one or more selection criteria such as for example the maximization of the capacity of the space division multiplexing system and/or the optimization of the average received energy. This allows to compensate for imperfections of the waveguide and/or imperfections of the optical components inserted in the optical transmission channel 13, such imperfections resulting in different losses undergone by the propagation modes and in different modal loss disparities. In embodiments using mode selection, the optical transmitter 11 may be configured to transmit the optical signal using a set of propagation modes previously selected among the available propagation modes. The number of propagation modes $N_t$ used to propagate the optical signals is then strictly inferior to the number of available modes N ($N_t < N$).

The optical transmitter 11 may further comprise one or more multi-carrier modulators 26 delivering a frequency-domain signal. The multi-carrier modulators 26 may be configured to generate a multi-carrier symbol by implementing a multi-carrier modulation technique within each optical carrier involving a large number of orthogonal sub-carriers. Multi-carrier modulation may be implemented to decouple the different propagation modes and provide a better resistance to the inter-symbol interference resulting from the fiber dispersion and crosstalk between the various modes. Exemplary multi-carrier modulation formats comprise Orthogonal Frequency Division Multiplexing (OFDM) and Filter Bank Multi-Carrier (FBMC).

The frequency-domain signal delivered by the multicarrier modulators 26 may be processed by a digital-optical Front-End 27 configured to convert the received frequency-domain signal into the optical domain. The digital-optical Front-End 27 may perform the conversion using a number of lasers of given wavelengths and a plurality of optical modulators (not shown in FIG. 2) associated with the used polarization states and with the used propagation modes. A laser may be configured to generate a laser beam of a same or different wavelength. The different laser beams may be then modulated using the different outputs of the OFDM symbols (or the different values of the codeword matrix in embodiments using single-carrier modulations) by means of the optical modulators and polarized according to the different polarization states of the fiber. Exemplary modulators comprise Mach-Zehnder modulators. A phase and/or amplitude modulation may be used. In addition, the modulation scheme used by the various optical modulators for modulating the different optical signals may be similar or different.

The number of the optical modulators and lasers may depend on the number of cores in the fiber, and/or on the number of polarization states and/or on the number of propagation modes used for the transmission of optical signals. The optical signals thus generated may be injected in the optical fiber 130 to propagate therein according to the selected propagation modes.

Figure 4:
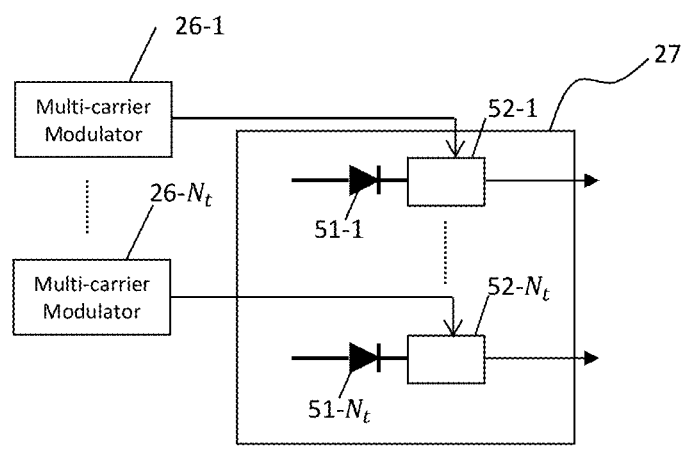
FIG. 4 is a block diagram of a Digital-Optical Front-End, according to certain embodiments.

FIG. 4 is a block diagram of the Digital-Optical Front-End 27, according to certain embodiments in which a single-core multi-mode fiber and a single polarization state are used. In such exemplary embodiments, the number of used propagation modes is lower than or equal to the number N of available propagation modes $N_t \leq N$. The Digital-Optical Front-End 27 may comprise:

- $N_t$ lasers 51-$i$ for i=1, ..., $N_t$ of a same wavelength $\lambda_n$. Each laser 51-$n$ is configured to generate a laser beam;
- $N_t$ optical modulators 52-$i$ for i=1, ..., $N_t$ associated with the $N_t$ propagation modes. Each modulator 52-$i$ may be configured to modulate a laser beam for a time of channel use using a component of the multi-carrier symbol or the codeword matrix in single-carrier embodiments. The modulated beams may be then injected into the multi-mode fiber to propagate each according to a separate mode.

In another embodiment in which wavelength division multiplexing is used, each laser 51-$n$ may use a plurality of wavelengths. The wavelengths may be similar or different. In such embodiment, the plurality $N_t$ of polarization modes may be combined with a plurality of W wavelengths, each mode being associated with W wavelengths. Accordingly, the Digital Optical Front-End 27 may comprise W lasers of different wavelengths, the beam generated by each laser being modulated by $N_t$ optical modulators (not show in FIG. 5).

In still other embodiments in which polarization division multiplexing is used, the optical signal may be transmitted over the two polarization states of the optical field. In such embodiments (not shown in the figures), the Digital Optical Front-End 27 may comprise $N_t$ lasers, $N_t$ polarization splitters configured to provide two orthogonal polarizations, and $2N_t$ optical modulators. Each pair of modulators may be associated with a laser and may be configured to modulate the signals which are polarized orthogonally. Exemplary polarization splitters comprise for example Wollaston prisms and polarization splitting fiber couplers. In addition, the optical fiber transmission link may further comprise polarization scramblers (not depicted in FIG. 1) configured to compensate the polarization dependent losses.

The optical signals generated according to any of the preceding embodiments may propagate along the fiber until it reaches the other end of the optical transmission link 13. At the end of the optical transmission link 13, the optical signals may be processed by an optical receiver 15.

At the optical receiver 15, the signal is detected by one or more photodiodes and is converted to the electrical domain. Analog-to-digital conversion is then performed and digital signal processing is applied to compensate for the transmission impairments. The information bits are estimated using an appropriate decoder. The architecture of the receiver 15 is in correspondence with the architecture of the transmitter 11.

Figure 5:
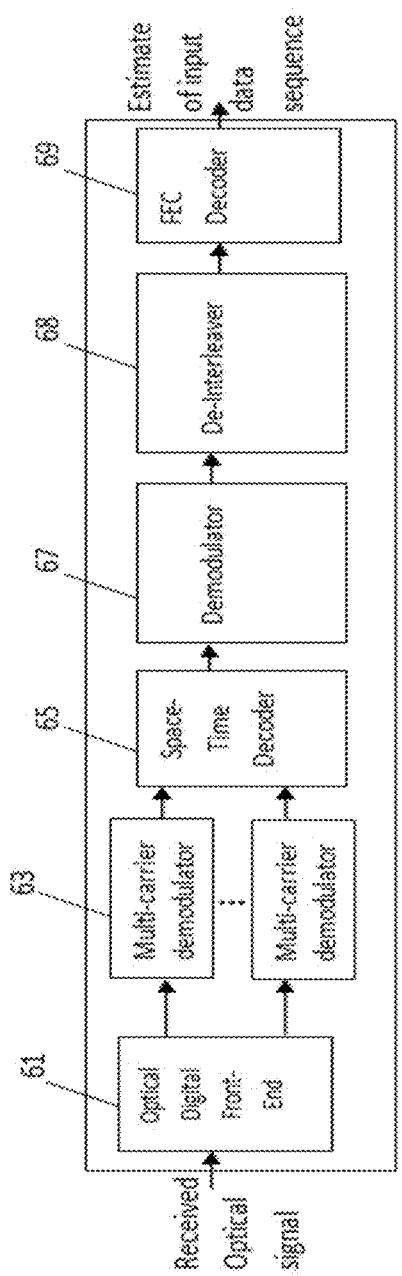
FIG. 5 is a schematic architecture of an optical receiver, according to certain embodiments.

FIG. 5 shows a schematic architecture of an optical receiver 15 corresponding to the transmitter of FIG. 4, according to certain embodiments.

The optical receiver 15 is configured to receive the optical signal transmitted by the optical transmitter 11 and to generate an estimate of the original input data sequence. As shown in FIG. 5, the optical receiver 15 may comprise:

- an optical-digital front-end 61 configured to detect the optical signal, using for example one or more photodiodes, and to convert it into a digital signal;
- a plurality of multi-carrier demodulators 63 configured to remove the cyclic prefix and generate a set of decision variables to be delivered to the Space-Time decoder 65;
- a Space-Time decoder 65 configured to generate an estimate of the modulated data sequence from the set of decision variables by applying a Space-Time decoding algorithm;
- a demodulator 67 configured to generate a binary sequence by performing a demodulation of the modulated data sequence estimated by the Space-Time decoder 65;
- a de-interleaver 68 configured to rearrange the order of the bits (in general the symbols) in the binary sequence delivered by the demodulator 67 to restore the original order of the bits; and
- a FEC decoder 69 configured to deliver an estimate of the input data sequence processed by the optical transmitter device 11 by applying a soft or hard-decision FEC decoder to the reordered binary sequence delivered by the de-interleaver 68. Exemplary soft-decision FEC decoders comprise the Viterbi algorithm.

The Space-Time decoder 65 may implement a Space-Time decoding algorithm, such as for example a decoding algorithm chosen in a group consisting of a maximum likelihood decoder, a Zero-Forcing decoder, a Zero-Forcing Decision Feedback Equalizer, and a Minimum Mean Square Error decoder.

Exemplary maximum likelihood decoders comprise the sphere decoder, the Schnorr-Euchner decoder, the stack decoder, the spherical-bound-stack decoder.

In certain embodiments using single-carrier modulations, the plurality of multi-carrier modulators 26 may be replaced by a single modulator. Similarly, the multi-carrier demodulators 63 may be replaced by a single demodulator.

In certain embodiments, a concatenation of two or more forward error correcting codes by the FEC encoder 22 may be used at the transmitter 11, and a corresponding structure may be implemented by the FEC decoder 69 at the receiver 15. For example, a serial concatenation of an inner code and an outer code may be used at the FEC encoder 22 at the transmitter side, the FEC decoder 69 at the receiver side then comprising an inner code decoder, a de-interleaver, and an outer code decoder (not shown in FIG. 4). In another example, two codes in a parallel architecture may be used by the FEC encoder 22 at the transmitter side, the FEC decoder 69 at the receiver side then comprising a de-multiplexer, a de-interleaver, and a joint decoder (not shown in FIG. 4).

According to certain embodiments in which a mode selection is performed at the transmitter, the optical receiver 15 may be configured to process only selected propagation modes among the propagation modes used by the transmitter 11, by operating a propagation mode selection. Alternatively, the optical receiver 15 may process all the available propagation modes.

Embodiments of the invention provide a mode scrambler 1 configured to apply a deterministic permutation of the propagation modes that are to be propagated along the downstream fiber slice 131 to which the output of the scrambler is connected, in the optical fiber transmission channel 13. The permutation is advantageously determined as a function of the power value associated with the propagation modes used by the transmitter 11.

For one polarization state, the optical transmission system 100 may be represented by an optical multiple-input multiple-output system described by the relation:

$$Y = H \cdot X + Z \quad (3)$$

In equation (4):
- X designates a codeword matrix that belongs to the codebook $A_{ST}$,
- Y is a complex-value matrix of dimensions $N_r \times T$ designating the received signal,
- H is a complex-value matrix of dimensions $N_r \times N_t$ designating the optical channel matrix (corresponding to the concatenation of k fiber slices) and represent the undergone attenuations during the optical signal propagation over the different propagation modes, and
- Z is a complex-value matrix of dimensions $N_r \times T$ designating the optical channel noise.

The codeword matrix X may be noted $X=[x_1, \ldots, x_M]^T$ with $M=N_t$ represents the emitted symbol vectors. The matrix $Y=[y_1, \ldots, y_M]^T$ represents the received symbol vectors.

The channel matrix accordingly satisfies $(HH^*)=N_t$, with Tr(A) designating the trace of a given matrix A and the operator $(.)^*$ designating the Hermitian conjugate operation.

Equation (3) may be rewritten as:

$$Y = \sqrt{L} \Pi_{k=1}^{k=K} (T_k \cdot C_k \cdot P_k) \cdot X + Z \quad (4)$$

In equation 4:
- index k correspond to the k-th fiber slice and K corresponds to the total number of slices;
- $T_k$ represents a diagonal matrix associated with the k-th slice 131 that accounts for modal noise with random phase entries $\exp(i\phi_m)$ with $\phi_m \in [0:2\pi]$;
- $C_k$ represents the non unitary modal coupling at the k-th slice 131 of the transmission channel 13 and may be computed using an overlap integral of the electrical field distribution (as described for example in S. Warm et al., "Splice loss requirements in multi-mode fiber mode-division-multiplexed transmission links," Opt. Express 21(19), 2013);
- $P_k$ is a permutation matrix of dimension $N_t \times N_t$, corresponding to the permutation applied by a scrambler (k−1) arranged upstream the k-th fiber slice 131 if k is a multiple of the scrambling period $K_{scr}$ (k=p·$K_{scr}$ with p being an integer value higher than one); $K_{scr}$ represents the distance separating two scramblers along the fiber 130); otherwise, the permutation matrix is set to an identity matrix.
- L represents the loss common to all modes.
- Z represents an additive white Gaussian noise vector with spectral density $Z_0$ per symbol and per mode; the channel noise may be modeled by a White Gaussian variable of $2\sigma^2$ variance per complex dimension.

The Modal Dispersion Loss (MDL) is defined as the ratio in decibels (dB) of the maximum to the minimum of the eigenvalues of $HH^*$, with operator $(.)^*$ designating the Hermitian conjugate operation.

Differential Mode Group Delay (DMGD) is not considered since it does not affect the capacity of the system and can be equalized using time domain filters or OFDM format with a suitable cyclic prefix.

Independent Gaussian distributed fiber misalignments in the directions x and y with zero mean (according to the coordinate space X, Y, Z represented in FIG. 2) and standard deviation (std) $\sigma_{x,y}$ are assumed.

Each permutation matrix $P_k$ comprises ($N_t \times N_t$) components $P_{ij}^{(k)}$ associated with a scrambler (k−1) corresponding to the k-th fiber slice 131. The components $P_{ij}^{(k)}$ may have a first value or a second value. In one embodiment, the components $P_{ij}^{(k)}$ have binary values (for example '0' or '1'). Each permutation matrix $P_k$ may be written as:

$$P_k = \begin{pmatrix} P_{11}^{(k)} & \cdots & P_{1N}^{(k)} \\ \vdots & \cdots & \vdots \\ P_{N1}^{(k)} & \cdots & P_{NN}^{(k)} \end{pmatrix} \quad (5)$$

The following description of certain embodiments will be made with reference to components $P_{ij}^{(k)}$ having binary values for illustration purpose only.

According to certain embodiments, each (k−1)th scrambler (1) may be configured to permute the propagation modes $M_l$. In particular, the (k−1)-th scrambler (1) may be configured to permute the propagation modes two-by-two, sequentially or in parallel. In one embodiment, the (k−1)-th deterministic scrambler 1 is configured to permute the mode having the i-th higher power with the mode having the i-th lower power among the modes. Accordingly, each scrambler 1 is configured to permute the mode $M_{l_{max}}^{(i)}$ having the i-th higher power value is permuted with the mode $M_{l_{min}}^{(i)}$ having the i-th lower power value among the modes, with i=1 to $[N_t/2]$. The square bracket notation [ ] designates the floor function.

Accordingly:
- the mode $M_{l_{max}}^{(1)}$ having the first higher power value $p_{l_{max}}^{(1)}$ is permuted with the mode $M_{l_{min}}^{(1)}$ having the first lower power value among the modes $p_{l_{min}}^{(1)}$;
- the mode $M_{l_{max}}^{(2)}$ having the second higher power value $p_{l_{max}}^{(2)}$ is permuted with the mode $M_{l_{min}}^{(2)}$ having the second lower power value $p_{l_{min}}^{(2)}$ among the modes; etc.
- the mode $M_{l_{max}}^{([N_t/2])}$ having the $[N_t/2]$-th higher power value $p_{l_{max}}^{([N_t/2])}$ is permuted with the mode $M_{l_{min}}^{(i)}$ having the $[N_t/2]$-th lower power value $p_{l_{min}}^{([N_t/2])}$ among the modes.

It should be noted that if $N_t$ is pair, $[N_t/2]=N_t/2$. If $N_t/2$ is impair, the mode with the $\lfloor N_t/2 \rfloor$-th higher power value $p_{l_{max}}^{(\lfloor N_t/2 \rfloor)}$ is not permuted ($\lfloor N_t/2 \rfloor$ corresponds to the smallest integer greater than or equal to $N_t/2$. The following description of certain embodiments will be made with reference to a pair number $N_t$, for illustration purpose only.

In the above example, the power values associated with the modes accordingly satisfy for $N_t$ pair:

$$p_{l_{max}}^{(1)} > p_{l_{max}}^{(2)} > \ldots > p_{l_{max}}^{(N_t/2)} > \ldots > p_{l_{min}}^{(N_t/2)} > \ldots > p_{l_{min}}^{(2)} > p_{l_{min}}^{(1)} \quad (6)$$

The optical signal may be then redistributed by the scrambler by switching the modes thus permuted.

By using at least one deterministic scrambler 1 that permutes the most attenuated modes with the least attenuated modes, the various embodiments of the invention mitigate the impact of MDL.

In some embodiments, each (k−1)-th mode scrambler (1) may be configured to determine the components of the permutation matrix $P_k$ corresponding to a permutation $\pi_k$. The permutation $\pi_k$ associates each of the $N_t$ propagation modes $M_i$ used by the transmitter 11 with another mode $M_j$:

$$\pi_k = \begin{pmatrix} M_1 & M_2 & \ldots & \ldots & \ldots & M_N \\ \pi_k(M_1) & \pi_k(M_2) & \ldots & \ldots & \ldots & \pi_k(M_N) \end{pmatrix} \quad (7)$$

According to the above notation, the mode permuted with $M_i$ is denoted $\pi_k(M_i)$.

The (k−1)-th scrambler receives the propagation modes in an initial order noted:

$$\pi_{k_0} = (M_1, M_2, \ldots, M_N) \quad (8)$$

To apply the permutation $\pi_k$, the modes of the initial mode vector $\pi_{k_0} = (M_1, M_2, \ldots, M_N)$ may be first sorted, according to a predefined ordering rule depending on the power values associated with each propagation mode. In one embodiment, the propagation modes may be ordered by increasing or decreasing values of the power values associated with the propagation modes. The following description will be made with reference to a decreasing order of the power values associated with the propagation modes to facilitate the understanding of the invention, although the skilled person will readily understand that the invention would similarly apply with an increasing order or may be implemented differently to permute the propagation modes depending on their power values.

In such embodiment, the propagation modes may be maintained in an ordered list (here list ordered by decreasing value of the power values associated with the modes). The first mode is the list after reordering, thus corresponds to the propagation mode having the higher power value, while the last mode corresponds to the propagation mode having the lower power value.

The modes may be then permuted such that:

$$\pi_k(M_i) = M_{N_t-i+1} \qquad (9)$$

In formula (9), i=1 to $[N_t/2]$, the square bracket notation [ ] designating the floor function.

In one embodiment, the component $P_{ij}^{(k)}$ of the permutation matrix at indexes (i,j) may be defined as follows:

$$P_{ij}^{(k)} = \begin{cases} 1 & \text{if } \pi_k(M_i) = M_j \\ 0 & \text{otherwise} \end{cases} \qquad (10)$$

The scrambler may apply the permutation matrix $P_k$ thus defined to the propagation mode vector $\pi_{k_0}$ storing the propagation modes in their initial order and then transmit the permuted modes along the k-th fiber slice (131).

Figure 6:
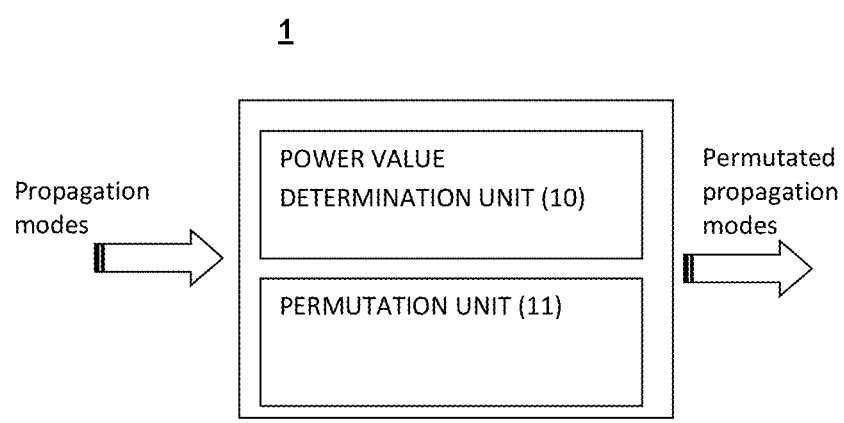
FIG. 6 shows the architecture of a scrambler, according to certain embodiments.

FIG. 6 shows the architecture of a scrambler 1 according to certain embodiments.

Each scrambler 1 may comprise a power value determination unit 10 configured to provide the power value associated with each mode and a permutation unit 11 for permuting the propagation modes depending on the power values associated with each mode. The scrambler may further be configured to redistribute the optical signal according to a permutation of the modes as determined by the permutation unit 11.

In some embodiments, the power value associated with each mode may be the average received energy per mode. The average received energy per mode may be determined offline, prior to the use of the optical transmission system 13. At this stage, the optical transmission system may be deprived of the scrambler 1. The power value per mode may be estimated by sending an optical signal having a unitary energy $E_s=1$ in the transmission channel for a number of channel realizations (e.g. $10^5$), and computing the average energy received at the receiver 15 over the channel realizations and propagated by each mode, which provides the average received energy per mode. The average received energy may be stored in a data structure in association with each mode.

The power value determination unit 11 of each scrambler 1 may determine the power value associated with each mode by retrieving the power value corresponding to each mode from the data structure.

Figure 7:
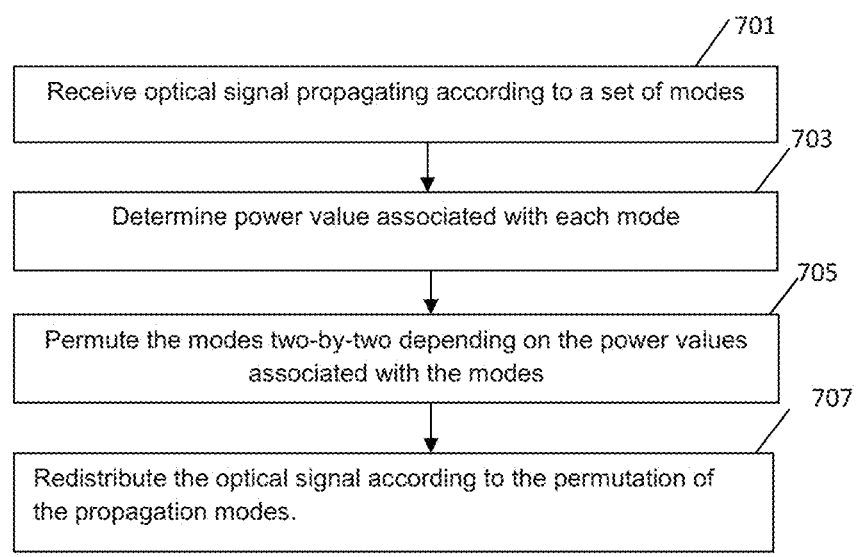
FIG. 7 is a flowchart depicting a scrambling method implemented by an optical mode scrambler, according to certain embodiments.

FIG. 7 is a flowchart depicting a scrambling method implemented by an optical mode scrambler, according to certain embodiments.

In step 701, an optical signal is received by the scrambler.

In step 703, the power value associated with each mode is determined.

In step 705, the modes are permuted depending on the power value associated with the modes.

In step 707, the optical signal is redistributed according to the permutation of the propagation modes.

In one embodiments, the step of permuting the modes may comprise permuting the modes two-by-two: the mode associated with the i-th higher power value with the mode associated with the i-th lower power value, with i being comprised between 1 and $[N_t/2]$.

Figure 8:
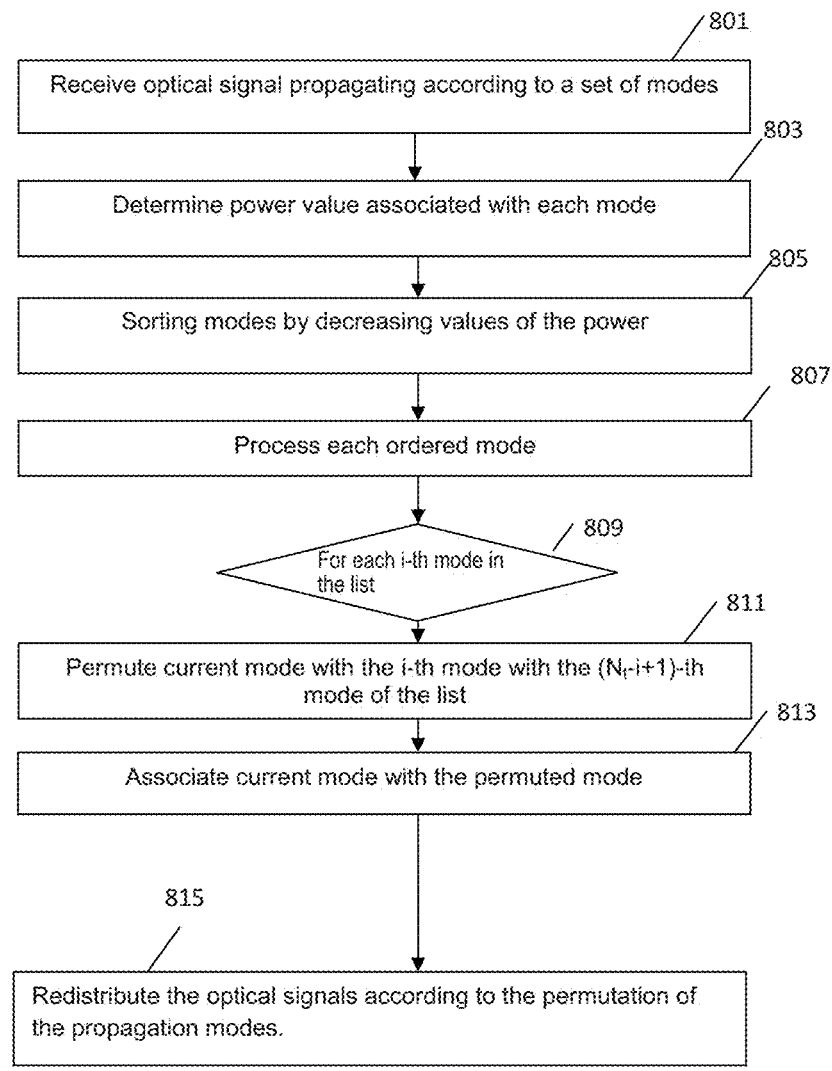
FIG. 8 is a flowchart depicting a scrambling method, according to a particular embodiment.

FIG. 8 is a flowchart depicting a scrambling method implemented by an optical mode scrambler, according to such embodiment.

In step 801, an optical signal is received by the scrambler.

In step 803, the power value associated with each mode is determined.

In step 805, the modes are sorted by decreasing power values and stored according to this order, in an ordered list.

The modes of the list are then permuted two-by-two (block 807).

More specifically, in step 809, the i-th mode $M_i$ in the list (i.e. having i-th higher power value) is permuted with the $(N_t-i+1)$-th mode $M_{N_t-i+1}$ of the list (i.e. having i-th lower power value), with i=1 to $[N_t/2]$.

Permutation information may be added in the list, in the entries related to mode $M_i$ and mode $M_{N_t-i+1}$ in step 813 ($\pi(M_i) = M_{N_t-i+1}$ in entry related to $M_i$ and $\pi(M_{N_t-i+1}) = M_i$ in entry related to $M_{N_t-i+1}$ to associate $M_i$ with $M_{N_t-i+1}$.

All the modes are consequently permuted two-by-two ($[N_t/2]$ permutations).

In step 815, the optical signal is redistributed according to the permutation of the propagation modes.

It should be noted that the permutation of step 809 may be performed in parallel for all the modes that are to be permuted (parallel permutations).

Figure 9:
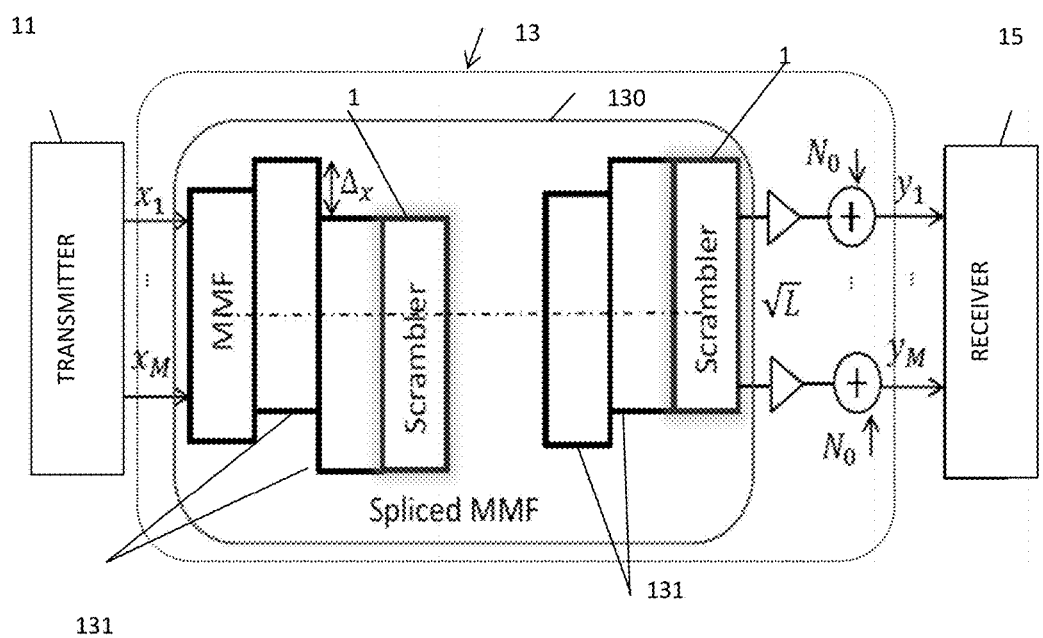
FIG. 9 illustrates an exemplary optical transmission channel.

FIG. 9 illustrates an exemplary optical transmission channel 13 with a wavelength fixed to $\lambda=1550$ mm and comprising a number K of misaligned fiber slices 131 equal to K=300. The K misaligned fiber sections are concatenated with random Gaussian misalignments $\Delta x$, $\Delta y$ of zero mean and a standard deviation $\sigma_{x,y}=3\%$. At the transmitter 11, the propagation modes are launched with unit energy $E_s=1$. The average received energy per mode may be computed at the receiver side 15 offline.

Figure 10:
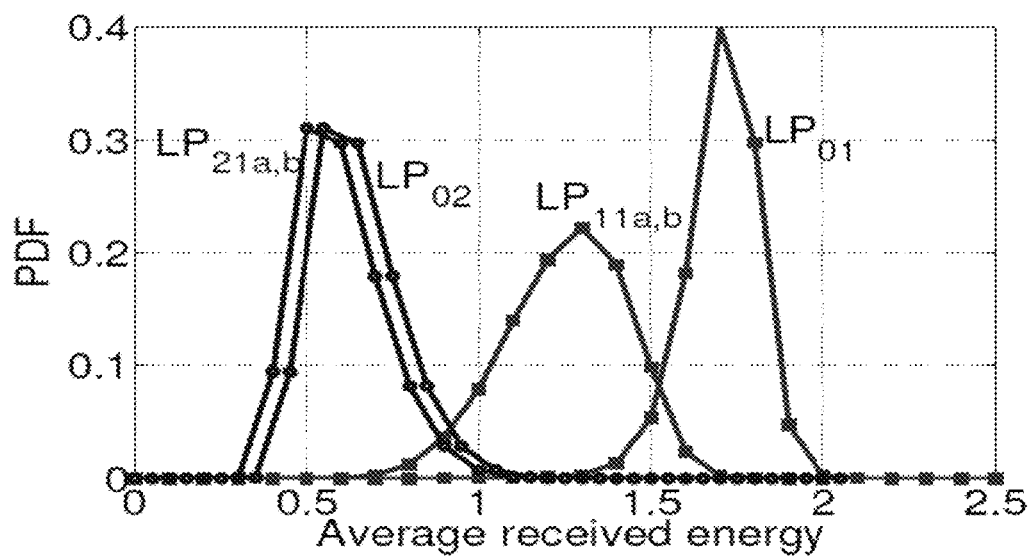
FIG. 10 is a diagram representing the Probability Distribution Function (PDF) of the average received energy per propagation mode.

FIG. 10 shows the Probability Distribution Function (PDF) of the average received energy per propagation mode for a 6-mode gradient-index fiber with a parabolic profile of core radius $r_c=8.7$ μm and a numerical aperture NA=0.203. In FIG. 10, the propagation modes are noted $LP_{0i}$. As shown in FIG. 10, the propagation modes which have higher power values (the power value of a mode corresponding in this embodiment to the average received energy per propagation mode at the receiver 15) are the modes $LP_{01}$, $LP_{11a}$, $LP_{11b}$ and the modes having the lower power values are $LP_{02}$, $LP_{21a}$, $LP_{21b}$. In this example, the scrambler 1 will permute the mode $LP_{01}$ with the $LP_{02}$ ($\pi_k(LP01)=LP02$), the mode $LP_{11a}$ with the mode $LP_{21a}$ ($\pi_k(LP11a)=LP21a$), and the mode $LP_{21a}$ with the mode $LP_{21b}$ ($\pi_k(LP21a)=LP21b$). The permutation will be written as:

$$\pi_k = \begin{pmatrix} LP01 & LP11a & LP11b & LP02 & LP21a & LP21b \\ LP02 & LP21a & LP21b & \ldots & \ldots & \ldots \end{pmatrix} \quad (11)$$

The Permutation Matrix is:

$$P_k = \begin{pmatrix} 0 & 0 & 0 & 1 & 0 & 0 \\ 0 & 0 & 0 & 0 & 1 & 0 \\ 0 & 0 & 0 & 0 & 0 & 1 \\ 1 & 0 & 0 & 0 & 0 & 0 \\ 0 & 1 & 0 & 0 & 0 & 0 \\ 0 & 0 & 1 & 0 & 0 & 0 \end{pmatrix} \quad (12)$$

The deterministic scrambler 1 according to certain embodiments of the invention has been compared to conventional random mode scrambling by simulating 105 channel realizations of the 6-mode fiber. The scrambling period $K_{scr}$ between two deterministic scramblers 1 according to such embodiments is set to $K_{scr}=50$ (a deterministic scrambler 1 is arranged in the fiber every 50 slices). Thereby, only a small number of scramblers 1 can be used with the invention (Number of scramble in this example equal to K/50) while a conventional random scrambler requires a scrambler at each connection between two fiber slices.

Figure 11:
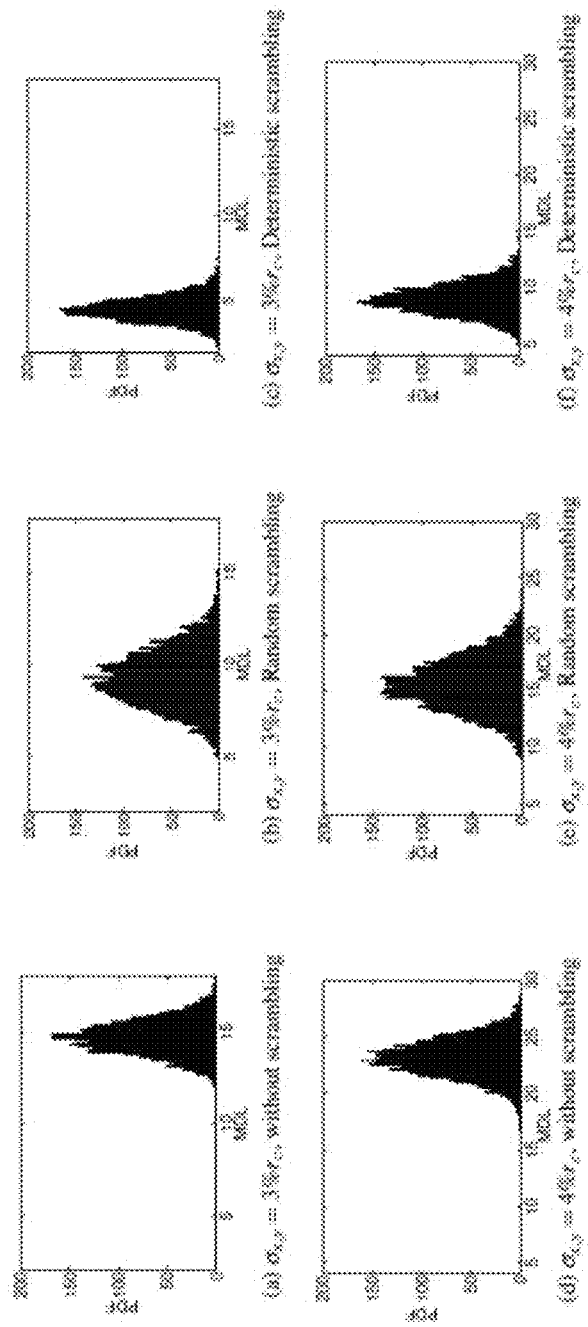
FIG. 11 shows diagrams representing the Probability Distribution Function (PDF) of the Mode Dependent Loss.

FIG. 11 shows diagrams representing the Probability Distribution Function (PDF) of the MDL for:
- conventional optical transmission links deprived of scramblers (diagrams (a) and (d));
- conventional optical transmission links comprising random scramblers (diagrams (b) and (c)); and
- optical transmission links comprising deterministic scramblers according to certain embodiments of the invention, with $K_{scr}=50$ (diagrams (c) and (f)).

The upper diagrams (a), (b) and (c) correspond to standard deviation $\sigma_{x,y}=3\%$. The lower diagrams (d), (e) and (f) correspond to standard deviation $\sigma_{x,y}=4\%$.

The diagrams show that random and deterministic mode scrambling reduce the impact of MDL, but the deterministic mode scrambling according to embodiments of the invention outperforms the random mode scrambling in terms of efficiency with respect to MDL reduction.

In particular, as shown in FIG. 11, for a misalignment $\sigma_{x,y}=3\%$:
- the average MDL without scramblers in the transmission line 13 (diagram (a)) is 15 dB,
- with random scrambling (diagram (b)), the average MDL is reduced to 9 dB,
- for the deterministic scrambling according to embodiments of the invention (diagram (c)), the average MDL is 5 dB.

For a misalignment $\sigma_{x,y}=4\%$:
- the average MDL without scrambling (diagram (d)) is 24 dB;
- with random scrambling (diagram (e)), the average MDL is reduced to 16 dB; and
- for the deterministic scrambling according to embodiments of the invention (diagram (f)), the average MDL is 9 dB.

Figure 12:
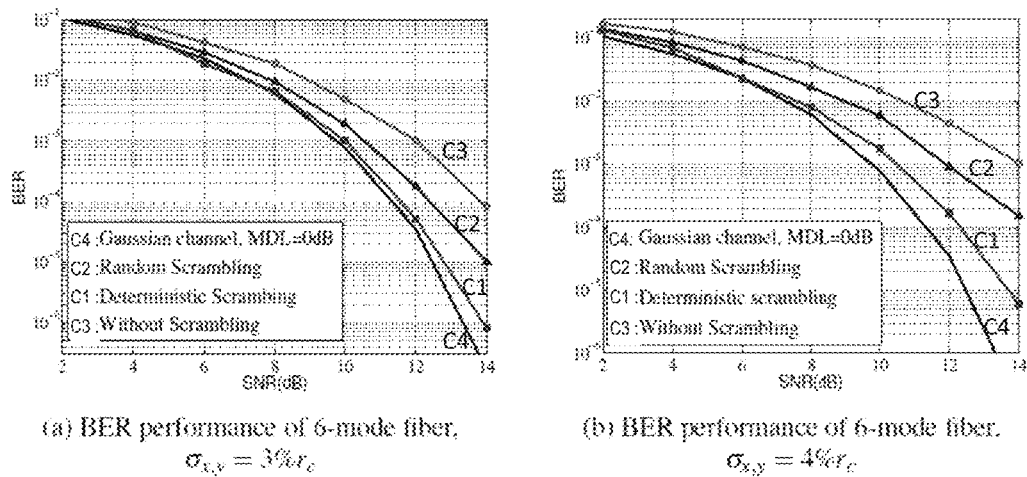
FIG. 12 shows two diagrams representing the Bit Error Rate (BER) performance obtained for a 6-mode fiber for different misalignments.

FIG. 12 shows two diagrams representing the Bit Error Rate (BER) performance obtained for a 6-mode fiber for a misalignment $\sigma_{x,y}=3\%$ (diagram (a)) and for a misalignment $\sigma_{x,y}=4\%$ (diagram (b)). The BER represents the effects of the MDL.

The diagrams of FIG. 12 have been obtained by simulating a 6-mode-multiplexed Space Division Multiplexing system 100 as defined by equation (4) using the same simulation parameters as for the diagrams of FIG. 11. The performance in terms of bit error rate (BER) curves has been compared versus the signal to noise ratio=$E_s/2Z_0$. At the transmitter 11, the modulated symbols belong to a 4-QAM constellation. At the receiver 15, a maximum-likelihood (ML) decoder searches for the symbol that minimizes the quadratic distance with the received symbol.

In diagram (a) and (b) of FIG. 12, curve C1 corresponds to the deterministic mode scrambler (curve C1) according to certain embodiments of the invention, curve C2 corresponds to conventional random mode scrambler, curve C3 corresponds to conventional optical transmission line without scrambler, and curve C4 corresponds to a reference Gaussian Channel (MDL=0 dB).

As shown by diagram (a) of FIG. 10, at BER=$10^{-3}$ and a misalignment $\sigma_{x,y}=3\%$:
- the deterministic mode scrambler (curve C1) according to certain embodiments has only 0.6 dB SNR penalty to the MDL-free channel (Gaussian channel),
- the conventional random mode scrambler (curve C2) has 2.1 dB penalty, As shown by diagram (b) of FIG. 12, at BER=$10^{-3}$, for a misalignment $\sigma_{x,y}=4\%$:
- the mode scrambler (curve C1) according to certain embodiments has only 2.2 dB SNR penalty to the MDL-Free channel (Gaussian channel),
- the conventional random mode scrambler (curve C2) has 4.2 dB loss to the Gaussian channel.

The deterministic mode scramblers 1 according to the various embodiments of the invention more efficiently distribute power between modes. Accordingly, at the end of the optical transmission link 13, all the propagation modes tend to have the same amount of power, thereby resulting in a significant reduction of the amount of the MDL.

It should be noted that in the above simulation examples, a scrambling period $K_{scr}=50$ has been considered for a total number K=300 misaligned fiber slices 131, hence a use of 6 scramblers 1. In real transmission systems, the number of scramblers to be used in the optical transmission channel 13 forms an important parameter in the design of Space Division Multiplexer systems. Mode scramblers 1 may be placed after optical components such as mode-multiplexers or after few mode amplifiers.

Figure 13:
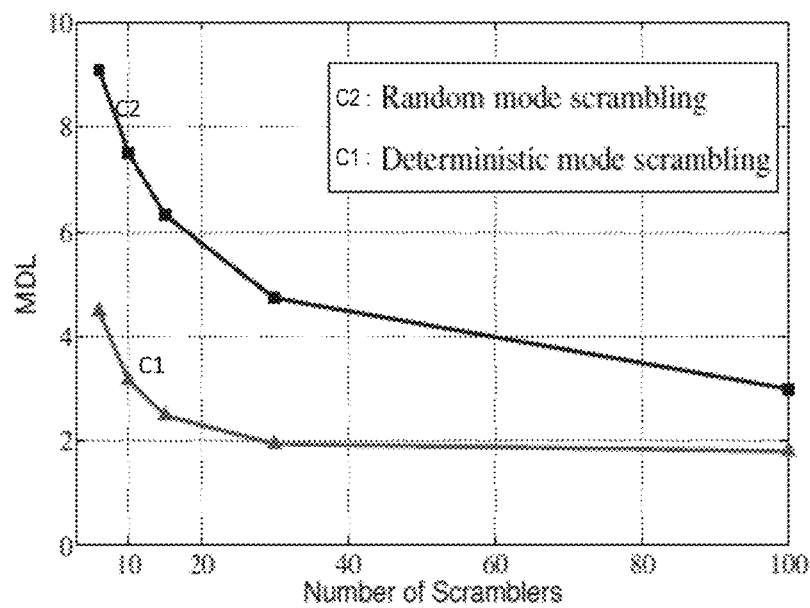
FIG. 13 is a diagram showing the dependency between the average link MDL and the number of scramblers.

FIG. 13 is a diagram showing the dependency between the average link MDL and the number of scramblers 1. In FIG. 13, curve C1 corresponds to the deterministic mode scrambler according to certain embodiments of the invention, while curve C2 corresponds to conventional random mode scrambler. As shown, the average link MDL is a function of the number of scramblers. The MDL decreases as the number of scramblers increases in both scrambling approaches. However, the MDL is significantly lower for a deterministic scrambling according to the embodiments of the invention in comparison to the average link MDL obtained for a conventional random scrambling. Further, to achieve a given average link MDL value, fewer deterministic mode scramblers are needed instead of the important number of random mode scramblers needed in conventional approach. For example, to achieve an average link MDL of 4 dB, only 8 deterministic mode scramblers are needed, instead of 60 random mode scramblers for a conventional random mode scrambler.

In certain embodiments, the number of scramblers may be strictly inferior to half the number of fiber slices.

In still other embodiments, the number of scramblers may be determined from the length of the fiber and/or the number of amplifiers.

Mode scrambling according to embodiments of the invention efficiently and significantly reduces the impact of mode dependent loss in optical transmission systems 100. By mixing modes having more power with modes having the less power, performances are significantly increased while requiring a small number of scramblers in the optical transmission channel. The number of scramblers 1 may be strictly inferior to K−1 with K representing the number of fiber slices, and preferably strictly inferior to [K/10]. In one embodiment, the number of scramblers may be strictly inferior to [K/30], for example to reach an MDL equal to 3 dB.

In certain embodiments, the number of scramblers to use in the transmission channel 13 may be determined from a target MDL value or interval, and/or the length of the fiber and/or the number of amplifiers.

Although the various embodiments have been described mainly in relation with single-core multi-mode fibers in which a single polarization, a single wavelength and single-carrier modulation are used, it should be noted that the invention can also be applied in multi-core multi-mode fibers, in combination with polarization multiplexing using two polarizations and/or in combination with the use of wavelength multiplexing using several wavelengths, and/or using multi-carrier modulation formats. The application of the invention in such optical-fiber systems may be based on a system model obtained from the generalization of the system defined by equation (3). Also, the invention is not limited to a transmitter 10 using both space-time coding and FEC encoder. The invention may also apply to transmitters using only space-time coding or FEC encoding only (and similarly at the receiver side only space-time decoding or FEC decoding).

Further, the invention is not limited to optical communication devices used in communications and may be integrated in a wide variety of optical devices such as data storage equipment and medical imaging devices. The invention may be used in several optical transmission systems used for example in application to automotive industry, in the oil or gas markets, in aerospace and avionics sectors, in sensing applications, etc.

While embodiments of the invention have been illustrated by a description of various examples, and while these embodiments have been described in considerable details, it is not the intent of the applicant to restrict or in any way limit the scope of the appended claims to such details. In particular, the permutation of the modes may depend on a particular function of the power values associated with the propagation modes. Further, the power value may be represented by different types of power parameters and may be determined or predetermined using different techniques. Also, in some embodiments, the number of scramblers may be precomputed depending on particular criteria or parameters. Additional advantages and modifications will readily appear to those skilled in the art. The invention in its broader aspects is therefore not limited to the specific details, representative methods, and illustrative examples shown and described.

The invention claimed is:

1. An optical fiber transmission link comprising a multimode optical fiber for scrambling light, the light comprising a set of optical signals propagated in said multimode optical fiber according to a set of propagation modes, each propagation mode being associated with a power value, said multimode optical fiber comprising fiber slices, wherein the optical fiber transmission link comprises a scrambler inserted between two fiber slices, the scrambler being configured to determine a permutation of said propagation modes depending on the power values associated with said propagation modes, the scrambler being configured to redistribute the optical signals according to said permutation of said-propagation modes.

2. The optical fiber transmission link according to claim 1, wherein the scrambler comprises a permutation unit for permuting the modes two-by-two, the permutation unit being configured to permute a mode associated with a i-th higher power value with the mode associated with a i-th lower power value, with i being comprised between 1 and a value representing the output of the floor function applied to Nt/2, with Nt designating the number of modes used by the scrambler.

3. The optical fiber transmission link according to claim 1, wherein the power value associated with a propagation mode represents an estimate of average energy received by propagating an optical signal through said propagation mode at a receiver.

4. The optical fiber transmission link according to claim 3, wherein the power value associated with a propagation mode represents an estimate of average energy received by propagating an optical signal through said propagation mode with a unitary energy at the transmitter side.

5. The optical fiber transmission link of claim 1, wherein the optical fiber transmission link comprises a number of scramblers and the fiber comprises a number of fiber slices, the optical fiber transmission link comprising at least two scramblers arranged in said fiber according to a predefined period, the number of scramblers being strictly inferior to the number of fiber slices.

6. The optical fiber transmission link of claim 1, wherein it comprises a number of amplifiers and a number of scramblers, the fiber having a given length, and wherein the number of scramblers depend on a target Mode Dependent Loss, and/or the length of said fiber and/or the number of amplifiers.

7. The optical fiber transmission link of claim 1, wherein the fiber slices are misaligned in one or two directions.

8. An optical communication system comprising an optical transmitter configured to transmit a data sequence over at least two spatial propagation modes through the optical transmission link of claim 1.

9. The optical communication system of claim 8, wherein it comprises:
   a forward error correcting code encoder configured to encode said data sequence into a codeword vector by applying at least one error correcting code;
   a modulator configured to determine a set of modulated symbols by applying a modulation scheme to said codeword vector; and
   a Space-Time encoder configured to determine a codeword matrix by applying a Space-Time code to said set of modulated symbols.

10. The optical communication system of claim 8, wherein the optical communication system comprises an optical receiver for decoding a signal comprising a data sequence received from said optical transmission link.

11. The optical communication system of claim 9, wherein the receiver comprises:
   a Space-Time decoder configured to decode said signal over a set of propagation modes lower than or equal to said at least two spatial propagation modes, which provides a set of modulated symbols;

a demodulator configured to determine an estimate of said codeword vector from said estimation of the set of modulated symbols by applying a demodulation scheme; and a Forward Error Correcting code decoder configured to generate an estimate of said data sequence by applying at least one error correcting code decoder to said codeword vector.

\* \* \* \* \*